US010335717B2

(12) United States Patent
Huda et al.

(10) Patent No.: US 10,335,717 B2
(45) Date of Patent: Jul. 2, 2019

(54) CARAFE FILTER WITH AIR LOCK PREVENTION FEATURE

(71) Applicant: KX Technologies LLC, West Haven, CT (US)

(72) Inventors: Stephen P. Huda, Shelton, CT (US); Andrew Lombardo, West Haven, CT (US)

(73) Assignee: KX Technologies LLC, West Haven, CT (US)

( * ) Notice: Subject to any disclaimer, the term of this patent is extended or adjusted under 35 U.S.C. 154(b) by 0 days.

(21) Appl. No.: 15/814,735

(22) Filed: Nov. 16, 2017

(65) Prior Publication Data

US 2018/0071660 A1    Mar. 15, 2018

Related U.S. Application Data

(63) Continuation of application No. 14/328,032, filed on Jul. 10, 2014, now Pat. No. 9,849,407.

(60) Provisional application No. 61/845,559, filed on Jul. 12, 2013.

(51) Int. Cl.
*B01D 29/00* (2006.01)
*B01D 29/21* (2006.01)
*B01D 35/30* (2006.01)
*B01D 36/00* (2006.01)
*C02F 1/00* (2006.01)

(52) U.S. Cl.
CPC ............. *B01D 29/00* (2013.01); *B01D 29/21* (2013.01); *B01D 35/30* (2013.01); *B01D 36/001* (2013.01); *C02F 1/003* (2013.01); *B01D 2201/296* (2013.01); *C02F 2201/006* (2013.01); *C02F 2307/04* (2013.01)

(58) Field of Classification Search
CPC ...... B01D 29/00; B01D 35/30; B01D 36/001; B01D 29/21; B01D 2201/296; C02F 1/003; C02F 2307/04; C02F 2201/006
USPC ....... 210/188, 435, 464–468, 470, 472, 473, 210/484, 487, 493.1, 513, 539, 282
See application file for complete search history.

(56) References Cited

U.S. PATENT DOCUMENTS

| 6,368,497 | B1 | 4/2002 | de Sylva | |
| 9,849,407 | B2 * | 12/2017 | Huda | B01D 29/00 |
| 2002/0005377 | A1 | 1/2002 | Tanner et al. | |
| 2003/0222010 | A1 * | 12/2003 | Bassett | B01D 27/06 210/312 |
| 2009/0057220 | A1 | 3/2009 | Nauta | |

(Continued)

FOREIGN PATENT DOCUMENTS

| EP | 2615066 | 7/2013 |
| KR | 200384584 | 5/2005 |

(Continued)

*Primary Examiner* — Madeline Gonzalez
(74) *Attorney, Agent, or Firm* — DeLio, Peterson & Curcio, LLC; Robert Curcio

(57) ABSTRACT

A filter for gravity-fed applications, having filter media with a hollow center, the filter being generally prone to a degradation or cessation in fluid flow due to air entrapment or air lock within the filter housing cavity, which develops during filtering. A diffuser element is introduced to pierce the entrapped air bubble, the diffuser element being an elongated structure connected to the filter housing top end cap and extending through the entrapped air bubble to the filter media.

8 Claims, 5 Drawing Sheets

(56) References Cited

U.S. PATENT DOCUMENTS

| | | | |
|---|---|---|---|
| 2011/0005991 A1* | 1/2011 | Merz | C02F 1/003 |
| | | | 210/244 |
| 2011/0089103 A1* | 4/2011 | Bommi | B01D 36/001 |
| | | | 210/472 |
| 2014/0027368 A1 | 1/2014 | Bell et al. | |

FOREIGN PATENT DOCUMENTS

| | | |
|---|---|---|
| KR | 1020090052451 | 5/2009 |
| KR | 1020090069583 | 7/2009 |

\* cited by examiner

CARAFE FILTER WITH AIR LOCK PREVENTION FEATURE

BACKGROUND OF THE INVENTION

1. Field of the Invention

The present invention relates to a filter, specifically, a filter that is designed for gravity-fed applications, having filter media with hollow center, the filter being generally prone to a degradation or cessation in fluid flow due to air entrapment or air lock within the filter housing cavity, which develops during filtering. A diffuser element or surface tension disrupter is introduced to the filter housing in order to pierce the entrapped air bubble, and prevent air lock from occurring during filtering by dispersing an otherwise large air bubble blockage, and allowing fluid to flow through the smaller entrapped air bubbles.

2. Description of Related Art

The presence of unwanted and potentially harmful contaminants in drinking water is a cause for health concern. This concern causes a desire for water treatment devices suitable for use in the home and as portable instruments for water treatment. Several types of gravity-flow filtration systems have been developed to address various health concerns.

A common application of the instant invention is directed to a batch treatment and filtration device where water is filtered, treated, and stored in a container. The treated water is poured from a spigot of the water container which functions as a self-contained water treatment system. These self-contained systems typically have upper and lower chambers separated by a filter cartridge. The most popular styles being the pour-through carafe or the refrigerator water tank. Such systems include an upper reservoir for receiving unfiltered water, a lower reservoir for receiving and storing filtered water, and a filter, usually of granular activated carbon or pleated fiber sheets, with at least one inlet at the filter housing top and at least one outlet at the filter housing bottom, which allows water to flow from the upper reservoir to the lower reservoir. The pour-through carafe is sized to be handheld, holds about one-half gallon of water, and may be tipped for pouring filtered water, as in a conventional pitcher or carafe.

Gravity flow carafe filters have been commercially available for several years and their popularity with consumers continues to grow. Currently available commercial water carafes are capable of removing lead using an ion exchange resin, undesirable tastes and odors using carbon granules, and large particles using a packed bed configuration.

The refrigerator tank system is typically a larger rectangular tank with a spigot for draining filtered water into a glass or pan. Both the carafe or tank designs use gravity to cause the unfiltered water in the top reservoir to flow down through the filter cartridge and into the lower reservoir where the filtered water remains until it is used.

Filter media used for these types of applications is generally cylindrical in shape with a hollow center for fluid flow. The introduction of the unfiltered fluid through the filter media is known to entrap air between the hollow center and the housing top cap, forming a large air bubble. This air bubble prevents fluid from entering the core and displacing the air, resulting in what may be generally referred to as a "vapor lock" or "air lock" condition, which degrades or ceases fluid flow.

In the prior art, care is taken to maintain a fully primed condition, i.e., preventing air access to the primed filter. Allowing air access allows blocking air inclusions removed during priming to re-form in the filter pore structure, significantly reducing flow until the primed condition is re-established. The advantage of maintaining the prime extends to essentially any micro-porous filter medium regardless of composition, including ceramic, carbon, or polymer membranes or filter bodies of inorganic or organic composition. However, this technique requires the filter media to remain constantly and completely submerged in water, so that air inclusions in the filter cannot re-form.

The present invention is designed to mitigate air lock upon introduction of unfiltered water into the filter media even when not fully submerged.

SUMMARY OF THE INVENTION

Bearing in mind the problems and deficiencies of the prior art, it is therefore an object of the present invention to provide a gravity-fed filtration system capable of maintaining fluid flow even when entrapped air within the hollow center of the filter media is introduced during filtration.

The above and other objects, which will be apparent to those skilled in the art, are achieved in the present invention which is directed to a filter for gravity-fed applications comprising: a top cap having fluid ingress apertures and in fluid communication with a filter media; the filter media having a hollow center; a bottom cap attached to the filter media; and a diffuser extending from the top cap to the filter media hollow center; wherein the top cap is substantially submerged by fluid during filtration, and the diffuser pierces any air bubble formed in the hollow center during the filtration.

The filtration includes submerging at least the top cap of the filter in fluid under gravity, and having the fluid enter the filter media through the hollow center, and traverse radially outwards through sidewalls of the filter media, or traverse axially downwards through the bottom cap, or both.

The diffuser may comprise an elongated cylindrical extension and may include a tapering sidewall.

The diffuser may extend within at least a top portion of the hollow center of the filter media, and may be integral with the top cap.

In a second aspect, the present invention is directed to a filter housing for gravity-fed applications including: a top end cap having apertures for fluid ingress; a housing body attached to the top end cap; a filter media having a hollow center and encased by the housing body; a bottom end cap attached to the housing body; apertures for fluid egress located through the housing body or the bottom end cap or both; and an airlock prevention probe attached to the top end cap, the airlock prevention probe extending from the top end cap to a point adjacent a topmost portion of filter media encased in the housing body.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5 of the drawings in which like numerals refer to like features of the invention.

Figure 1:
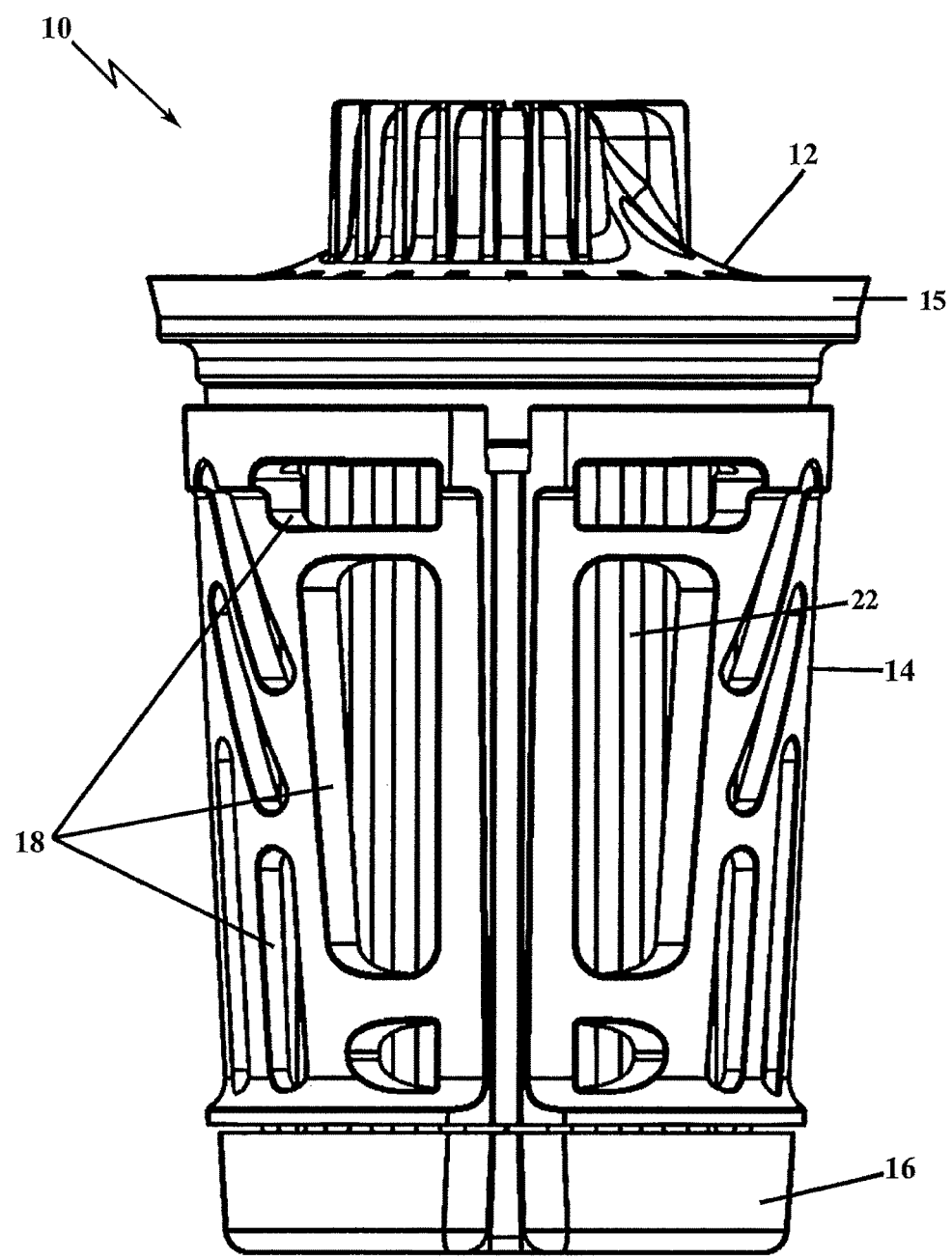
FIG. 1 depicts a side view of a filter housing that employs the air lock prevention feature of the present invention.

FIG. 1 depicts a side view of a filter housing 10 that may be used to employ the novel air lock prevention feature of the present invention. Like most filter housings, filter housing 10 includes a top cap 12 circumferentially secured or attached to a filter media top end cap 15, which attaches to filter media 22. Filter media top end cap 15 is generally fixed to filter media 22 by a sealant or friction fit. Filter media 22 is shown as pleated fiber sheets, but may also be a carbon block or other suitable media having a hollow center. As a pleated layered material, filter media 22 may also include a pleat pack, an outer fiber sheet, and a drainage layer. Other layered combinations are not excluded, and the present invention will work well with any filter media having a hollow center.

The filter may further include a side housing shell or outer shroud 14. The filter media is terminated circumferentially to a bottom cap 16. In this embodiment, the filter side housing shell has side apertures 18 on shroud 14, which allow for filtered fluid to flow out of filter housing 10; however, side housing apertures 18 need not be configured or shaped as shown, and any aperture configuration that allows for continuous filtered fluid flow into a retaining basin would be sufficient. For a gravity-fed filtration system it is only necessary that an egress aperture be available for filtered water to flow into the retaining basin or storage container (not shown). Such designs normally employ a bottom egress point at bottom cap 16, which could be utilized in the present invention without adverse performance, or side housing apertures as shown.

The present invention is designed to accommodate filter media where fluid permeates radially through the media and may exit the sidewalls or the bottom cap. This directional flow generally causes air to build-up in the hollow center of the filter media. The entrapped air may cause vapor lock, which ultimately degrades or substantially ceases fluid flow.

Figure 2:
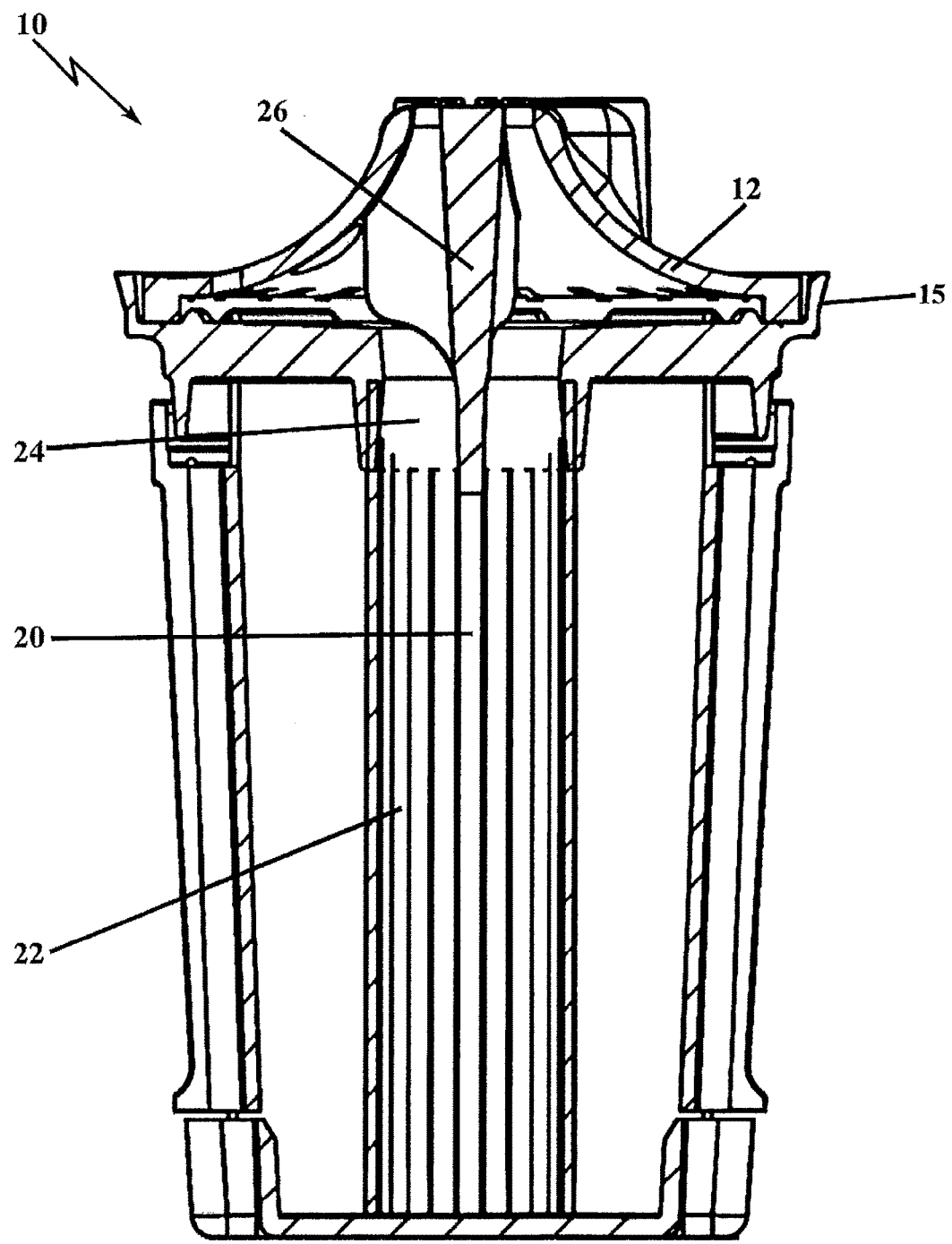
FIG. 2 depicts a cross-sectional view of the filter housing of FIG. 1.

FIG. 2 depicts a cross-sectional view of filter housing 10 of the present invention. Hollow center 20 centers filter media 22 about an axial center of cylindrical filter 10. In this embodiment, filter media 22 comprises pleated fiber sheets; however, the filter media may also be a solid block media, such as an extruded cylindrical, carbon block. The filter housing is designed so that fluid flows from ingress ports on top cap 12 and filter media top end cap 15 through hollow center 20 of filter media 22, and radially outwards towards side apertures 18. Fluid may also flow outwards through the periphery of bottom cap 16 after having traversed through filter media 22.

Generally, an air pocket or bubble 24 located at the top of filter media 22 will entrap air within hollow center 20 during filtration, and adversely affect fluid flow into hollow center 20. Essentially, during filtration top cap 12 is submersed in fluid, and air is not easily able to escape the filter. To mitigate this air entrapment, top cap 12 includes an elongated surface tension disrupter or diffuser 26 extending from top cap 12 adjacent to, or extending within, hollow center 20, and specifically designed to pierce air pocket 24, preferably terminating just below the topmost portion of filter media 22. Diffuser 26 is preferably shaped in a needle-nose or pin-like fashion capable of piercing air pocket 24, and breaking up the surface tension that holds and forms air pocket 24 into smaller air bubbles that are not capable of retaining a vapor lock. In this manner, any air buildup at air pocket 24 which is formed as a consequence of fluid ingress will no longer adversely affect the fluid flow since the surface tension of the air pocket is destroyed by the surface tension disrupter or diffuser 26.

Diffuser 26 may be a shape other than a needle-nose or pin-like extension. For example, it may be an elongated cylindrical extension, or the like, that by design protrudes into and through a potential air bubble of predetermined size within hollow center 20, and extends within the topmost portion of the filter media. The length of diffuser 26 is such that it is capable of extending within hollow center 20 to pierce an air bubble of predetermined size.

As depicted in the drawings, diffuser 26 is shown preferably shaped as a needle-nose tube, having a generally cylindrical cross-section with a tapering endpoint at the junction of filter media 22. However, the present invention is not limited to any particular cross-sectional shape for the diffuser provided that the selected shape allows the diffuser to pierce the air bubble that forms during fluid flow.

Figure 3:
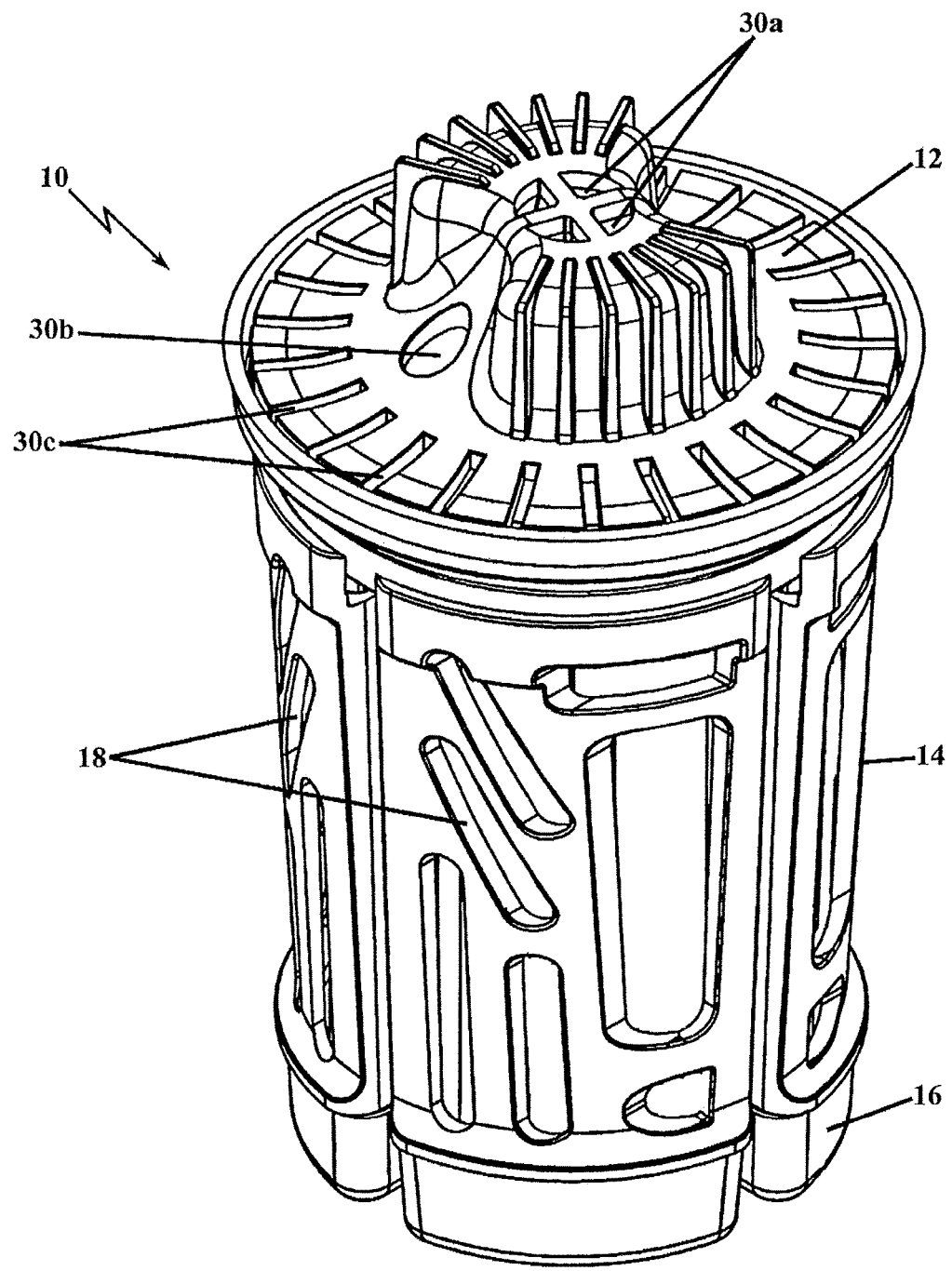
FIG. 3 depicts a top perspective view of the filter housing of FIG. 1.

FIG. 3 depicts a top perspective view of the filter housing of the present invention. Top cap 12 is depicted with several water ingress ports or apertures 30*a-c*. Apertures 30*a-c* allow fluid to flow into filter 10 when the filter top cap 12 is partially, or more likely, completely submerged in fluid. Fluid enters through these apertures and is directed to the hollow center 20 of filter media 22. Fluid is directed to the side walls of filter media 22, traversing radially outwards from hollow center 20.

Figure 4:
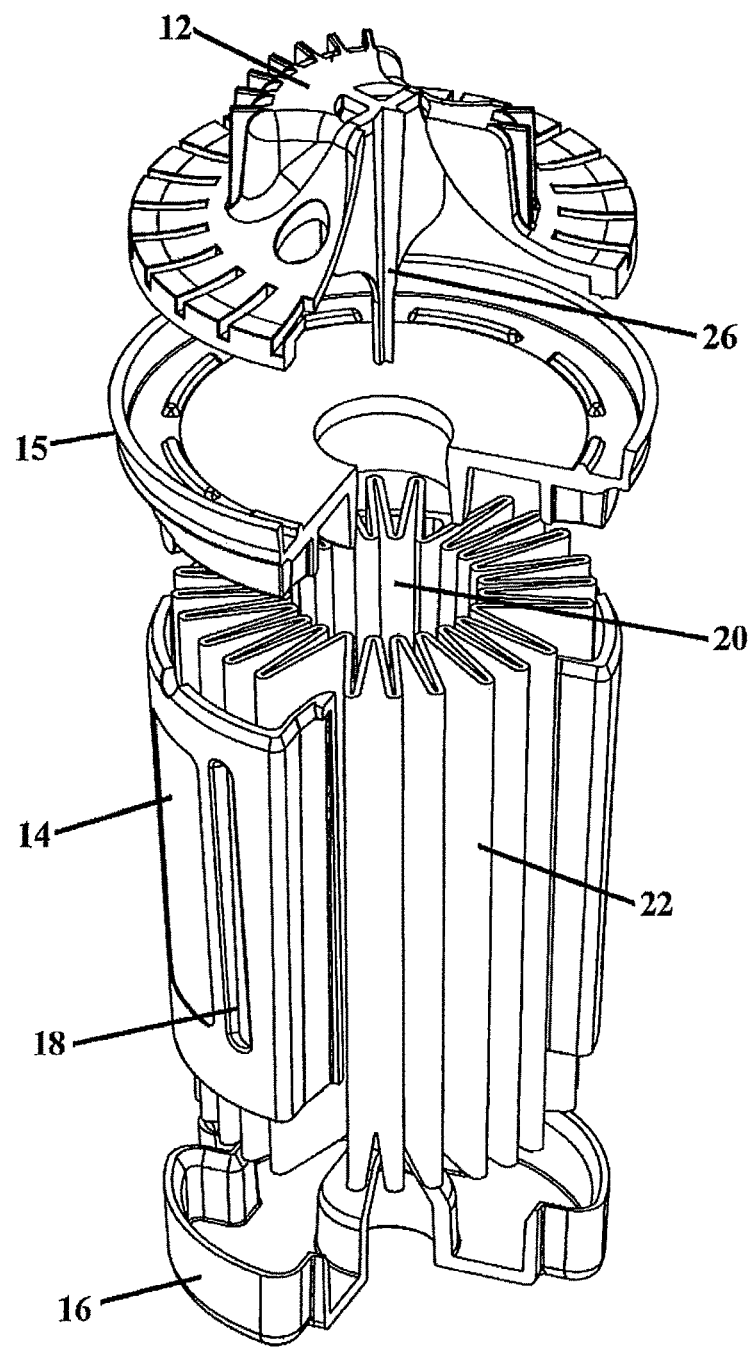
FIG. 4 depicts a top perspective, exploded view of the filter housing with a sidewall.

FIG. 4 depicts a top perspective, exploded view of the filter housing 10 with a sidewall 14. Sidewall 14 may or may not include apertures. If sidewall 14 does not include apertures, bottom cap 16 would provide apertures for fluid egress. In the embodiment depicted by FIG. 4, sidewall 14 is shown with apertures 18 for fluid egress.

As noted previously, filter media 22 is depicted as a set of pleated sheets; however, it is also possible to use a solid cylindrical filter core, such as a carbon block core, alone or in tandem with a pleated filter media.

Figure 5:
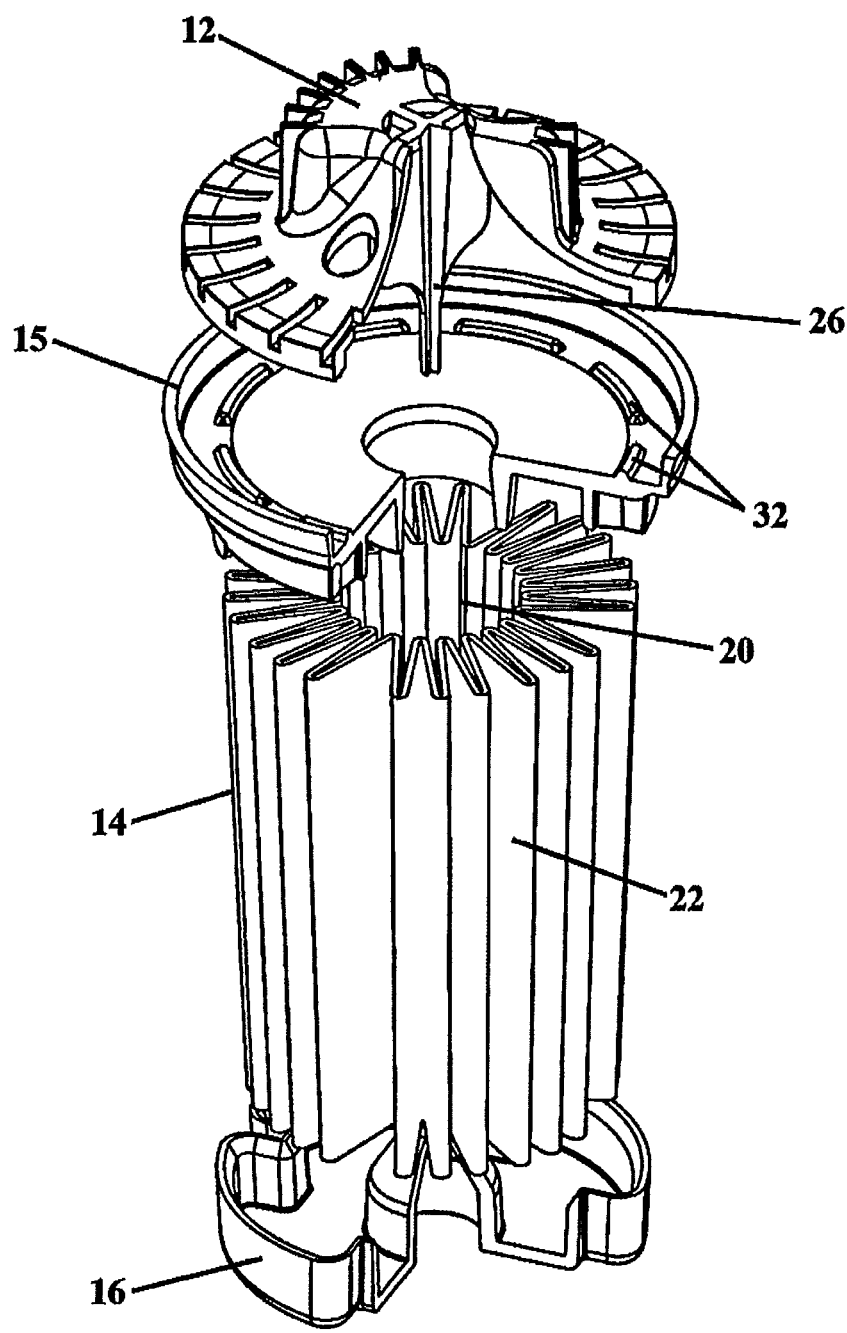
FIG. 5 depicts a top perspective, exploded view of the filter housing without a sidewall.

FIG. 5 depicts a top perspective, exploded view of the filter housing 10 without a sidewall. Fluid enters hollow center 20 and exits radially through the sides of filter media 22. Also depicted in FIG. 5 are alignment tabs 32 to help secure top cap 12 with diffuser 26 to filter media end cap 15.

The present invention is not limited to the application of a single filter media, or of a filter media consisting solely of pleated sheets. As long as a center core is prone to entrapping air during filtration, a diffuser employed to pierce any air bubble formed during fluid flow would sufficiently mitigate against an air lock condition that would otherwise develop whenever the fluid flow ingress exceeds the air flow egress.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, Thus, having described the invention, what is claimed is:

1. A filter housing for gravity-fed applications including:
   a top cap having at least a first aperture for fluid ingress;
   a filter media having a hollow center;
   a filter media top end cap having apertures for allowing fluid ingress to said filter media;
   a filter media housing body attached to said filter media top end cap;
   a bottom end cap attached to said housing body;
   at least a second aperture through a side of said housing body, said bottom cap, or both, for fluid egress;
   a surface tension disrupter extending from said top cap to at least within a top portion of said filter media hollow center, such that said surface tension disrupter within said top portion of said filter media hollow center, pierces a resulting air pocket formed by fluid flow through said filter media.

2. A filter housing for gravity-fed applications including:
   a top end cap having apertures for fluid ingress;
   a housing body attached to said top end cap;
   a filter media having a hollow center and encased by said housing body;
   a bottom end cap attached to said housing body;
   apertures for fluid egress located through said housing body or said bottom end cap or both;
   a diffuser in the shape of an elongated probe in a needle-nose or pin-like fashion attached to said top end cap, said diffuser extending from said top end cap to a point below and into said filter media hollow center adjacent a topmost portion of filter media encased in said housing body.

3. The filter housing of claim 2 wherein said diffuser comprises a predominantly cylindrical cross-section.

4. The filter housing of claim 3 wherein said diffuser includes a tapering sidewall.

5. The filter housing of claim 2 wherein said diffuser is integral with said top end cap.

6. A filter housing for gravity-fed applications including:
   a top cap having at least a first aperture for fluid ingress;
   a pleated filter media formed in a cylindrical shape and having an approximate cylindrical hollow center;
   a pleated filter media top end cap having apertures for allowing fluid ingress to said filter media;
   a filter media housing having a cylindrically shaped body attachable to said pleated filter media top end cap;
   a bottom end cap securing said pleated filter media and attachable to said cylindrically shaped housing body;
   at least a second aperture through a side of said housing body, said bottom cap, or both, for fluid egress;
   a surface tension disrupter extending from said top cap to below at least a top portion of said pleated filter media and within the approximate cylindrical hollow center, wherein said surface tension disrupter includes a tapering sidewall, such that said surface tension disrupter is capable of piercing a resulting air pocket formed by fluid flow through said filter media.

7. The filter housing of claim 6, wherein said pleated filter top end cap or said bottom end cap is integral with said housing body.

8. The filter housing of claim 6 wherein said surface tension disrupter is integral with said pleated filter media top end cap.

* * * * *